United States Patent Office 3,837,986
Patented Sept. 24, 1974

3,837,986
MOLDED ARTICLE FORMED OF FIBER
REINFORCED MATERIAL
Werner Görter, Baden, Erich Kresta, Perchtoldsdorf, and
Horst Stumpf, Baden, Austria, assignors to Semperit
Aktiengesellschaft, Vienna, Austria
Filed July 30, 1971, Ser. No. 167,768
Claims priority, application Austria, Aug. 5, 1970,
A 7,107/70
Int. Cl. B32b 5/12
U.S. Cl. 161—59                                      16 Claims

ABSTRACT OF THE DISCLOSURE

A molded article comprising an elastomeric material and essentially oriented fibers embedded in said elastomeric material. The molded article includes at least two sections containing such fibers, wherein said fibers of said sections possess respective orientation directions differing from one another.

There is also disclosed a method and apparatus for forming such molded articles wherein there is provided a hollow mold having a mold compartment, and means define at least one auxiliary compartment provided for said hollow mold. The hollow mold includes at least one mold section constructed to be movable to displace molding material containing the fibers and used for forming the article into a part of the hollow compartment of said mold which is initially free of molding material.

BACKGROUND OF THE INVENTION

The present invention relates to a new and improved method and apparatus for the fabrication of molded articles or bodies formed of fiber reinforced material and also pertains to improved molded articles formed in accordance with the aforesaid method and through the use of the aforesaid apparatus constructions of this development. In its more specific aspects the present invention relates to new and improved molded articles formed of a first polymeric material containing embedded fibers which are essentially oriented and a second material having a modulus of elasticity which deviates from that of the aforesaid first material, the articles produced by this invention being, by way of example, conveyor bands, tires, wound or heating bellows, and further, this invention pertains to a novel method and apparatus for the production of these molded articles.

It is known to form molded articles from elastomeric materials by injection molding or extrusion in molds. In this respect it is also here mentioned that reinforcement inserts can be placed into the mold prior to the injection molding or extrusion operations. In order to overcome the need for such additional operational procedures it has already been proposed to introduce into the mixture these reinforcement elements, for instance in the form of short glass fibers, textile or metallic yarns, and then to inject into the mold the mixture containing these fibers, yarns or the like. When using this procedure it is also of course possible to fabricate strand-like or continuously molded articles. Since in both cases a flow operation occurs in which individual parts of the material carry out a relative movement with respect to one another the yarns or fibers are placed in essentially parallel orientation relative to one another with regard to the flow direction, in other words they are oriented. Hence there is obtained a molded article, which owing to the oriented fibers, is improved in respect of its strength characteristics in the direction of fiber orientation whereas it possesses a lower strength in a direction perpendicular to such fiber orientation direction. These strength differences which are desired for a great many molded articles are the same throughout all portions or sections of the body or article. In a great number of cases, however, it is also desired for certain reasons to have different strength characteristics prevail at different sections of the molded article.

SUMMARY OF THE INVENTION

Hence it is a primary object of this invention to fulfill in a most reliable and effective manner the previously mentioned varying strength characteristics throughout different portions or sections of a molded article.

Another and more specific object of the present invention is to provide a new and improved molded article by means of which these desired different strength characteristics can be obtained and wherein such molded article possesses two or more portions or sections having different direction of orientation of the fibers or the like.

The strength of a fiber reinforced material or a polymeric material, in which fibers are embedded, is dependent upon a number of parameters, among which there should be mentioned especially the quantitative relationship and strength values of the plastic and fiber material respectively, the obtained adherence between both materials and, in particular, upon the relationship of the orientation of the fibers with respect to the direction of loading of the molded article.

In order to achieve special effects, such as for instance a certain uniform elasticity of the molded article with respect to tensile loads in a certain direction, it can be particularly advantageous if two or more layers formed of the first polymeric material containing fibers of the second material are bonded into a layered material having at least two different orientation directions.

Previously attempts have been made for different fields of application to impart strength in certain directions by embedding in the polymeric material forming the base mass continuous yarns or filaments, such as twisted or cord layers, bunched together cord packages, also fabric layers. However, there always resulted a more or less pronounced anisotropic effect which produced an irregular force distribution, and therefore, viewed in its entirety, generally required a more extensive or expensive construction in order to be able to take up certain loads. In contrast thereto, with the inventive molded articles even when taking into account the different portions or sections with different orientation direction of the embedded fibers, the force distribution is much more favorable, even if the specific strength of the composite assembly is less since the much thinner fibers taking up the forces are more uniformly distributed.

The inventive molded article can be fabricated in that the individual portions or sections of the molded article, each of which contains fibers formed of the second material embedded in a pre-determined uniform orientation direction in the first polymeric material, can be connected with one another in known manner, for instance by winding together, adhesive bonding or the like. However, it has been found to be particularly advantageous if at least one portion or section of the molded article, containing embedded fibers oriented in one direction, is subjected to an intentional flow in a flow direction deviating from the original orientation direction of the fibers. This flow direction can be, for instance, produced in that the article section where the fiber orientation should be changed, is subjected to a tensile and/or compressive load in the deviating direction. A reorientation can also then be obtained if the material of the relevant section is subjected to relative movement, for instance with the aid of mold elements which are moved relative to one another, away from one another, or towards one another, or is subjected to an intentional shearing action. In so doing, the new orientation can be achieved, for instance, by carrying out a displacement towards one another of superimposed material layers.

The first polymeric material used in fabricating the inventive molded article or body can be formed of practically any optional and known plastic or rubber matrix. It is however already known to fabricate plates with embedded staple fibers having an oriented direction of the fibers by drawing plastic or rubber mixtures containing fibers into plates at a calender or by extruding such mixtures at an extruder by means of a wide mouth nozzle. In both cases there takes place, depending upon the processing viscosity of the first polymeric material, the thickness of the plates and the stiffness of the fibers, a more or less complete orientation of the staple fibers in the flow direction and perpendicular to the roller nip or gap. It has been found that the fiber orientation becomes that much better and extends that much more completely the lower the viscosity of the polymeric material and the smaller the roller gap (or the smaller the dimension of the wide mouth nozzle) and the stiffer the fibers. On the other hand, each fiber, the greater its stiffness, is subjected to an increased destruction by tearing or rupture at the keading or mixing machine if the polymeric material possesses a relatively high viscosity. Therefore, it has been found to be advantageous to fabricate the molded articles from two such materials, wherein there is combined as high as possible modulus of elasticity of the fiber material and as low as possible Mooney plasticity and viscosity of the polymeric material at its processing temperature. This is especially so if, then, as just mentioned, at least one section or portion of the molded article is intended to be subjected to a further flow operation. A particularly advantageous manifestation of the invention is realized if there is used as the polymeric material a so-called "liquid rubber," such as for instance polybutadiene with hydroxyl groups, cross-linked with isocyanate, or polybutadiene with carboxyl groups, cross-linked with epoxy resins. When using such polymeric material, which first then solidifies after having been molded, it is possible to orient fibers of greater stiffness and length by suitable flow operations without causing such to break or to rupture.

However, it is also possible to obtain for the inventive molded articles the two different orientation directions of the fiber material or the like if, during or after filling of the mold, the corresponding article portions or sections are subjected to different flow directions and/or shearing action, the latter for instance by carrying out suitable relative movement of the mold surfaces with respect to one another.

Fibers which are more flexible, as for instance rayon, even if subjected to the same orientation treatment are not aligned or oriented as well as stiff fibers. However, under certain circumstances stiff fibers, such as for instance those formed of polyester, owing to their greater mechanical strength are nonetheless better able to withstand the mixing and kneading operations than flexible rayon fibers.

It is then also possible to use as the polymeric material rubber mixtures formed on the basis of natural rubber, resulting in the advantage that such mixtures can be produced with a fiber content exceeding 10% by weight, preferably 20% to 40% by weight, and possess the required green strength in order to be able to be drawn into plates at the calenders.

In the event portions or sections of the molded article are not to be subjected at a later time to further flow operations, rather there takes place an assembly together of article portions with different fiber orientation, then it has been found to be advantageous to use cut mixtures on the basis of 70 parts by weight natural rubber and 30 parts by weight styrene butadiene rubber, which are not as sensitive with regard to heat, and, if desired, can be pre-vulcanized before they are worked into molded articles. As a reuslt, it is no longer possible for there to occur any subsequent change in the fiber orientation during the further mechanical processing of the molded article.

In order to obtain the previously mentioned green strength while still, however, affording an inexpensive and good processable mixture, it is possible to utilize a mixture formed on the basis of 50 parts by weight natural rubber, 20 parts by weight polybutadiene rubber and 30 parts by weight oil extended styrene butadiene rubber. Then through the addition of nitroso compounds in a conventional manner it is possible to improve the workability so that the mixture can be exceedingly well drawn at the calender. The use of such nitroso compounds has been set forth in detail in U.S. application, Ser. No. 134,398, filed Apr. 15, 1971, and now abandoned, entitled "Synthetic Rubber Composition," and similarly assigned to the assignee of this application, and to which reference readily may be made.

In the event that the inventive molded article is constructed as a pneumatic tire then, as already mentioned, it is possible to form the individual layers, previously conventionally consisting of rubberized cord, now as polymeric material containing oriented fibers and in known manner to wind such up into tire blanks. In so doing, carcass layers having a fiber orientation in radial direction or in a direction which slightly deviates from the radial direction are wrapped about the bead core and there are utilized belt layers with fiber orientation in the peripheral direction or in a direction deviating slightly from such peripheral direction (then however in pairs with the opposite deviational sense from the peripheral direction). In this case the belt layers are selected preferably so that towards the top they become narrower (stepped) in width so that during vulcanization a running together of the edges occurs. It has namely been found that at the transition regions the carcass layers tend to deform unduly to the left and right adjacent the belt owing to the vulcanization pressures which propagate over the tread. Owing to compression of the carcass assembly at such regions there quite easily occur weakened locations which can lead to premature deformation of the tire.

It can be advantageous also to select one or a number of sections or portions having different fiber orientation and simultaneously possessing different hardness, as for instance is the case for a tire possessing belt layers of a material of greater hardness, for instance containing fibers with approximately 90° $Sh_A$ in contrast to about 85° $Sh_A$ for the carcass layers.

Further it has been found to be advantageous if the ratio of the modulii of elasticity in the fiber orientation direction and transverse thereto lies in a range between 30:1 and 200:1, preferably between 50:1 and 100:1.

Suitable for use with the inventive molded articles are not only fiber materials such as the already mentioned polyester or rayon fibers, rather also those formed of polyamide, glass, metal or the like. The strength-elongation relationship of the organic fibers and therefore indirectly their rigidity as well as the breaking or rupture load of a yarn can be seen from the following table:

| Type of yarn | Strength of the pure fiber in g./den. | Elongation, percent | Breaking load of a base yarn (once twisted) of 3.3 den. |
|---|---|---|---|
| Polyester | 8 | 9.4 | 26 |
| Nylon 66 | 9 | 16.5 | 30 |
| Nylon 6 | 8 | 18 | 26 |
| Rayon | 5.4-5.9 | 11.4 | 18-19 |

The polyester fiber or yarn is stiffer owing to its increased modulus and therefore can be oriented easier. As already mentioned owing to its increased stiffness it tends to break into smaller pieces much more easily during the mixing operation if its increased strength were not to counteract such. Glass fibers and metallic filaments or threads were considered previously to be much too stiff, and apart from such, have certain pronounced bonding or adherence problems associated therewith. When utilizing the previously mentioned liquid rubber it is however possible, according to the invention, to produce molded articles which have quite advantageous properties.

The adherence of the fibers, especially in relation to rubber polymers, can be achieved in conventional fashion and, for instance, can be improved by the addition of agents which split off formaldehyde in conjunction with finely divided silicic acid fillers.

As explained previously, a further aspect of this development relates to a novel apparatus for carrying out the invention process and for producing the inventive molded articles or bodies.

Hence, according to a further manifestation of the invention, there is proposed an apparatus for carrying out the inventive process wherein a hollow mold possesses at least one auxiliary compartment from which introduced material can be displaced by means of, for instance, a movable mold section or element constructed as a piston, into the hollow mold compartment which initially is still free of material. It is advantageous if at least one section of the hollow mold can be moved at an angle to the oriented fibers of the material located in the hollow mold, essentially parallel to the material surface in contact with such mold section.

According to a further more specific physical construction of the apparatus, particularly for the fabrication of a tire, it is contemplated to provide at least one compartment concentrically disposed with respect to the axis of the hollow tire mold. A piston arranged in this compartment is movable in the direction of the hollow tire mold. Into this compartment there is inserted some material having oriented fibers in such a fashion that it partially fills the hollow tire mold and comes to bear with at least one portion or section of the material within such compartment. Now the piston arranged in such compartment is moved towards the hollow tire mold so that the material displaced by such piston is pressed into the hollow tire mold and fills such completely. The material subjected to this flow now possesses a different directional orientation of the fibers, whereas the remaining material portion or section still possesses the original fiber orientation. In order to be able immediately to fabricate the tire in its final form it is advantageous if the work surface of the piston forms a portion of the hollow tire mold. For instance, it is possible to provide two concentric compartments at the tire shoulder regions, whereby the material is inserted at the tread regions and extends with its lateral sections into these compartments. The material is reinforced by the fibers oriented in the peripheral direction of the tire. Due to the movement of the pistons the material flows into the side wall regions of the hollow tire mold and has imparted thereto on orientation which is essentially perpendicular to the fiber orientation at the tire tread.

It is also contemplated by the teachings of this invention to change the orientation direction during or after the flow operation in that, at least one mold section is movable in the peripheral direction with respect to the remaining mold sections. This mold section can be arranged at the tread region and/or at least at one bead region. Owing to these measures it is possible to obtain at such regions an exact fiber orientation in the peripheral direction.

Certain directional changes or transition zones can also be obtained between two orientation directions in that it is possible to provide deflecting ribs and/or deflecting grooves at the hollow tire mold. By virtue of these ribs or grooves it is possible to change, in a very simple and exact fashion, the flow direction of the material and therefore the orientation direction of the fibers or the like.

BRIEF DESCRIPTION OF THE DRAWINGS

The invention will be understood better and objects other than those set forth above will become apparent when consideration is given to the following detailed description thereof. Such description makes reference to the annexed drawings wherein.

DETAILED DESCRIPTION OF THE PREFERRED EMBODIMENTS

Figure 1:
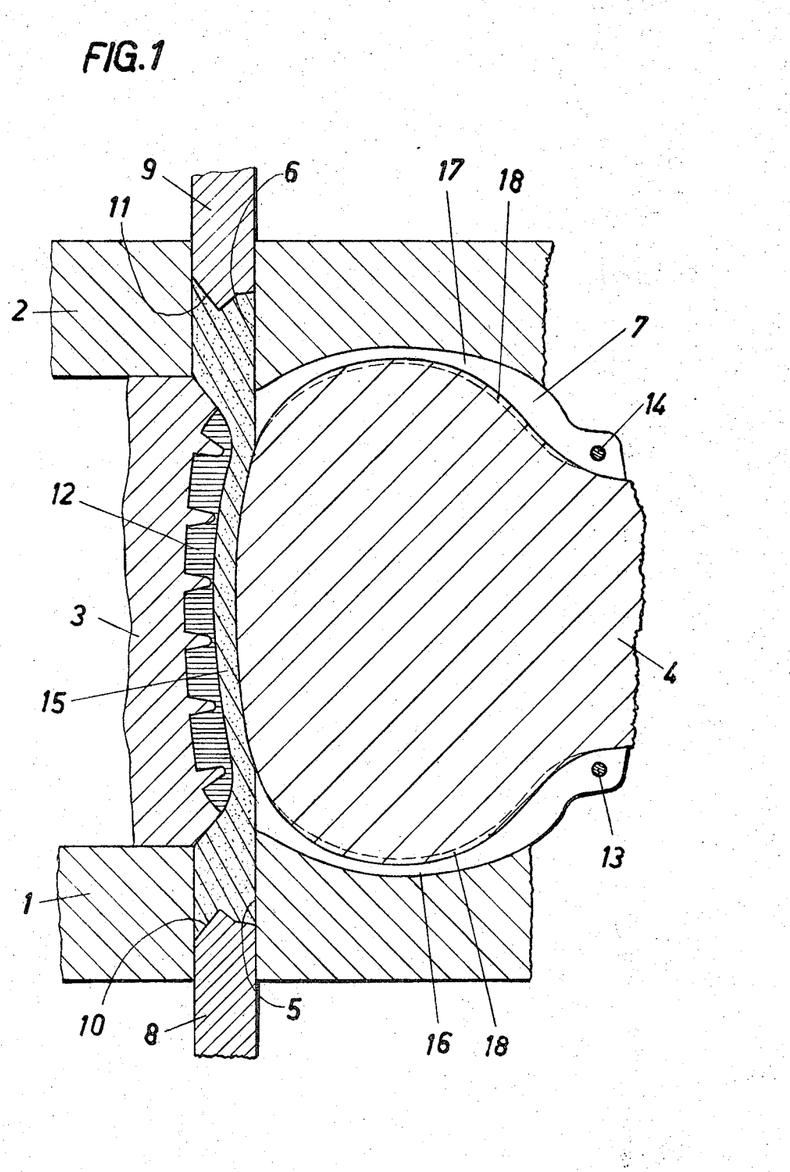
FIGS. 1 and 2 illustrate different respective working phases of a first embodiment of the invention as utilized in the production of a tire.
Figure 2:
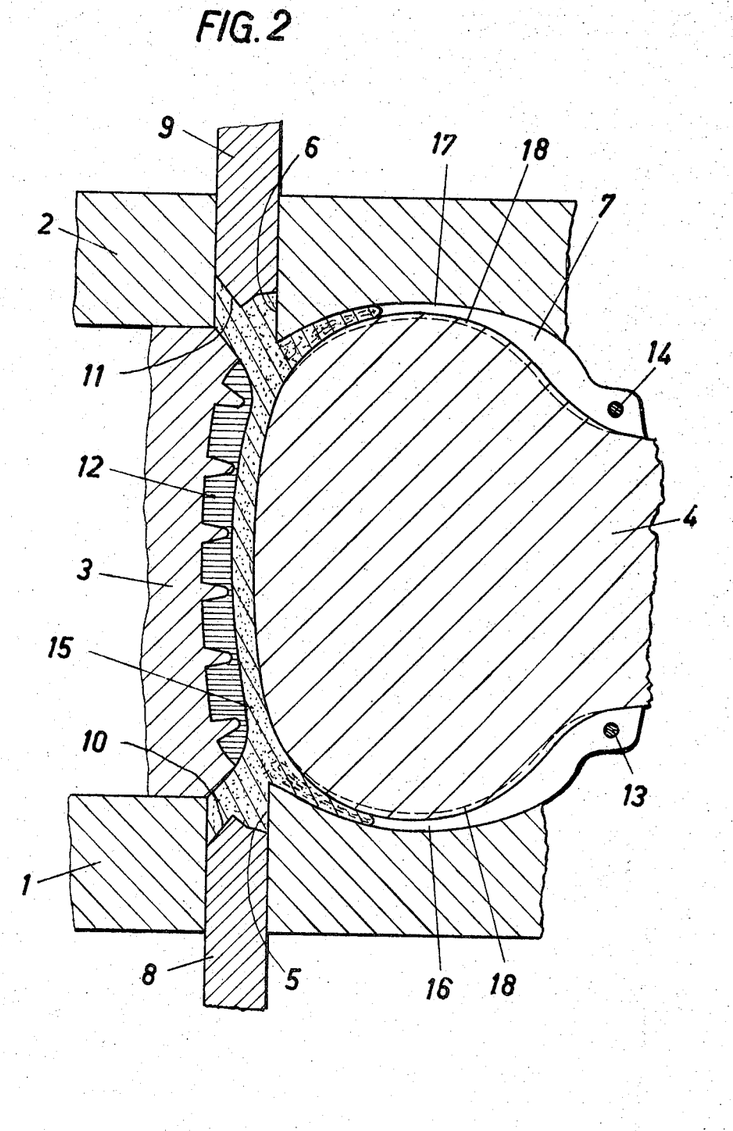

Describing now the drawings, the apparatus construction way of example in FIGS. 1 and 2 will be seen to consist of a hollow mold embodying two mold halves 1 and 2 for the outside surfaces of the side walls of a tire and a ring-shaped mold portion 3 for profiling the tread of the tire. Within these mold portions 1, 2, and 3 there is arranged a mold core 4. The mold halves 1 and 2 will be seen to be equipped at the shoulder region of the tire with ring-shaped compartments 5 and 6 concentrically disposed with respect to the tire axis. Within the compartments 5 and 6 there are arranged ring-shaped pistons 8 and 9 which can be moved in the axial direction of the tire towards the hollow tire mold 7. The work surfaces 10 and 11 of these pistons 8 and 9 form a portion of such hollow tire mold.

At the beginning of the tire fabrication operation there are inserted into the compartment of the hollow tire mold 7, a tread 12 and the bead cores 13 and 14, and for the purpose of fixing such in position there can be provided any suitable and therefore non-illustrated support devices, as is quite well known in this particular art. As best seen by referring to FIG. 1, there is then inserted a material web 15 having fibers, filaments or the like, oriented in the peripheral direction of the article. Thereafter, the pistons 8 and 9 are displaced towards the interior of the hollow tire mold 7, so that the material located in the compartments 5 and 6 flows into the regions of the side walls 16 and 17 of such hollow mold, as best seen by referring to FIG. 2. During this so-called flow operation the fibers or the like at the side wall region or section are reoriented and following completion of such flow operation such fibers are located so as to be oriented essentially in the radial direction. Stated in another way, if the section of the flowable material at the tread region and the side wall sections are projected into a common plane then it will be apparent the orientation of the fibers at the tread region and side wall sections will be respectively different from another. The grooves 18 provided at the mold core 4 serve for stabilizing the flow direction. At the tire shoulder region the fibers, following completion of the flow operation, are essentially in a random orientation so that a good transition zone is achieved. The tread surface section of the material web 15 is not subjected to any flow movement so that the above-mentioned peripheral fiber orientation is not altered.

Figure 3:
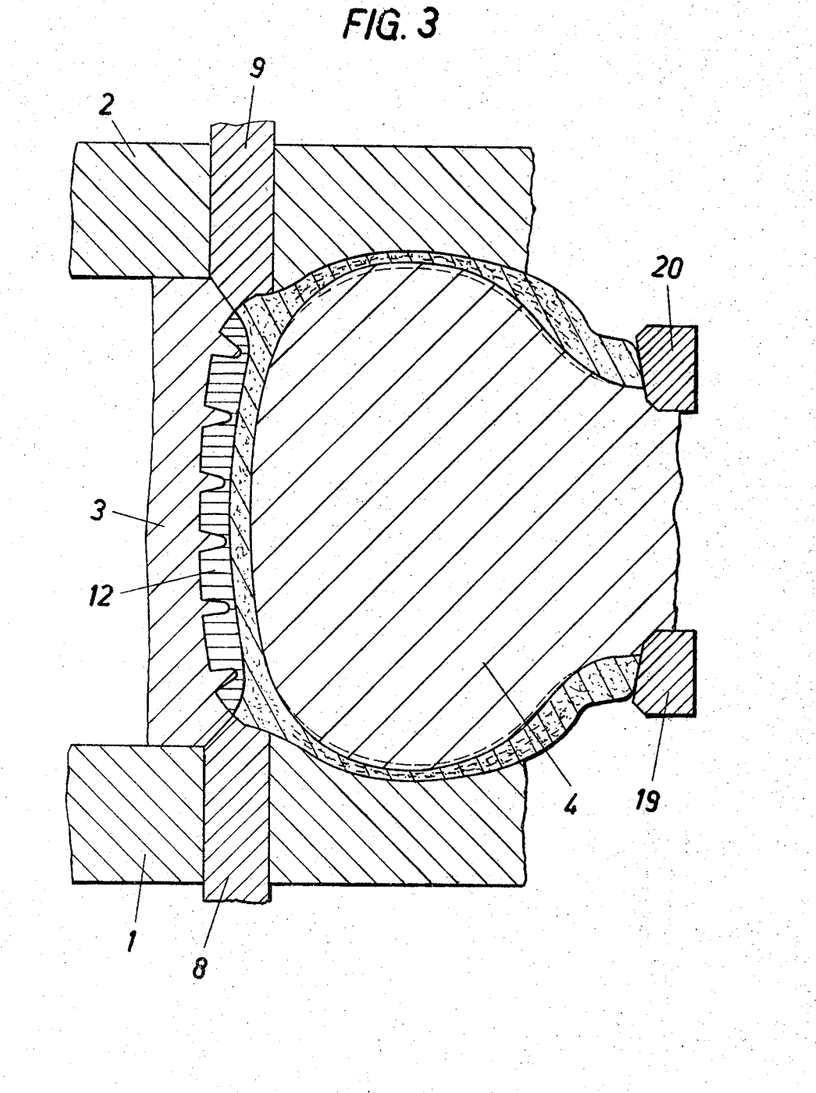
FIG. 3 is a further modification of the embodiment of FIGS. 1 and 2.

Now in FIG. 3 there is shown a construction of apparatus which is quite similar to that of the arrangement of FIGS. 1 and 2. However, with this arrangement the apparatus is here additionally provided at the tire bead region with two ring-shaped mold sections 19 and 20 rotatable in the peripheral direction. During or after completion of the flow operation both of these mold sections 19 and 20 are placed into rotational movement, so that the material located at the tire bead section is likewise moved in the peripheral direction and the fibers located at such bead section are oriented in the same direction. With sufficient fiber orientation it is possible to dispense with the use of the bead cores previously discussed.

Figure 4:
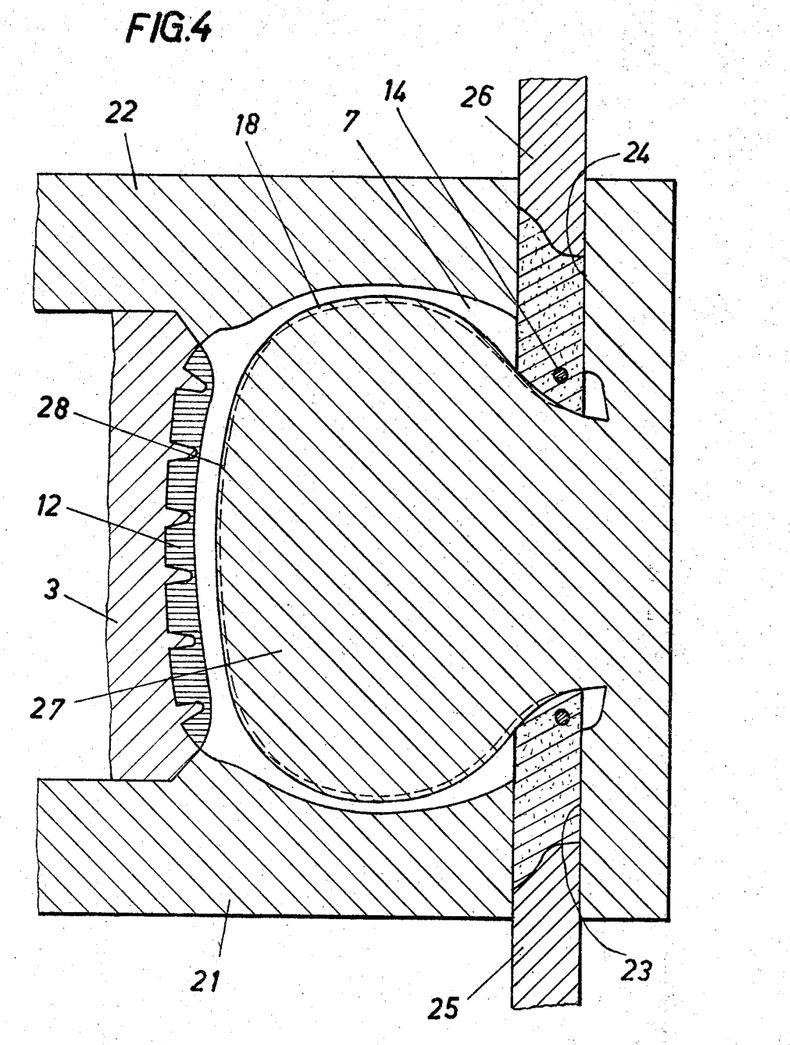
FIGS. 4 and 5 illustrate a further embodiment of the invention respectively showing different operating phases.
Figure 5:
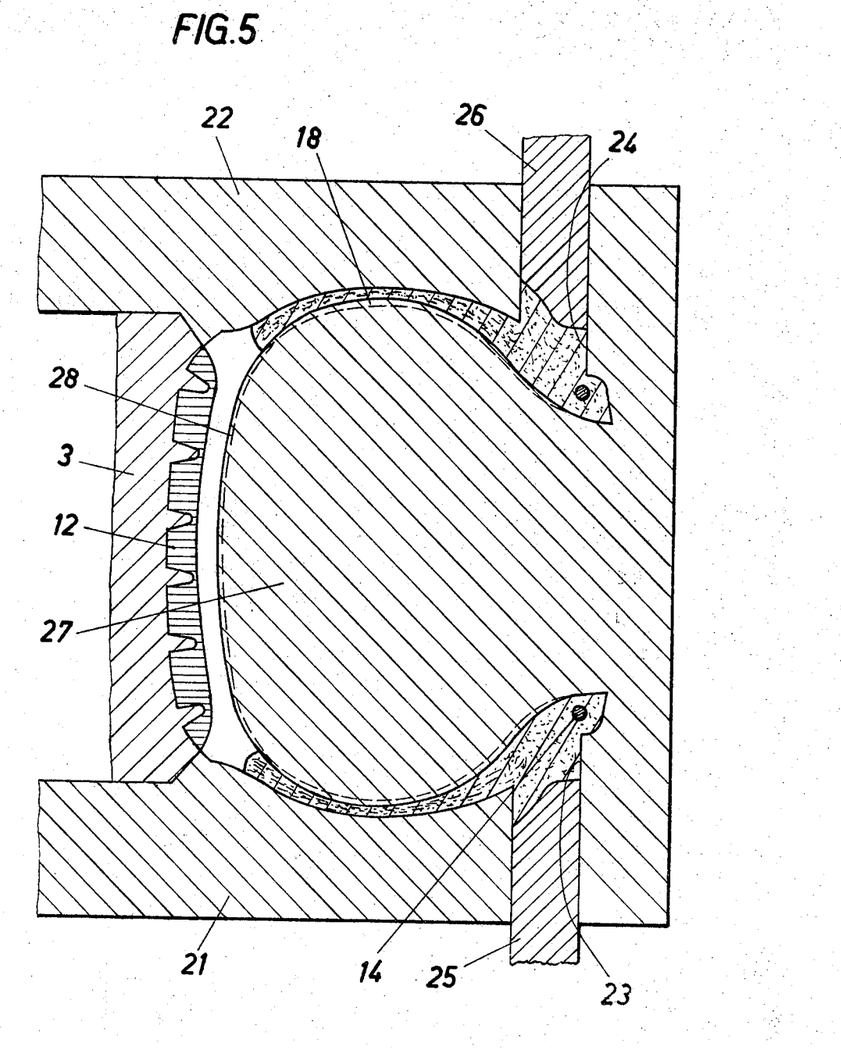

Now with the embodiment of apparatus as depicted in FIGS. 4 and 5 compartments 23 and 24 are provided at the mold halves 21 and 22 at the bead region of the tire. These compartments 23 and 24 correspond to the compartments 5 and 6 of the apparatus structure depicted in FIGS. 1 and 2. Here also there are provided pistons 25 and 26 which are guided in such compartments 23 and 24 respectively. As best seen by referring to FIG. 4, after insertion of the tread 12, the material is deposited into the mold in the form of two rings at the bead region, the fibers being oriented in the peripheral direction and the bead core 14, if desired, can already be embedded in the material. By displacing the pistons 25 and 26 towards one another there is initiated the flow of the material. Through the provision of the ribs 18 and 28 at the mold core 27 the material at the side wall regions, as best seen by referring to FIG. 5, is initially guided essentially in radial direction and at the region of the tread 12 essentially in the peripheral direction.

Figure 6:
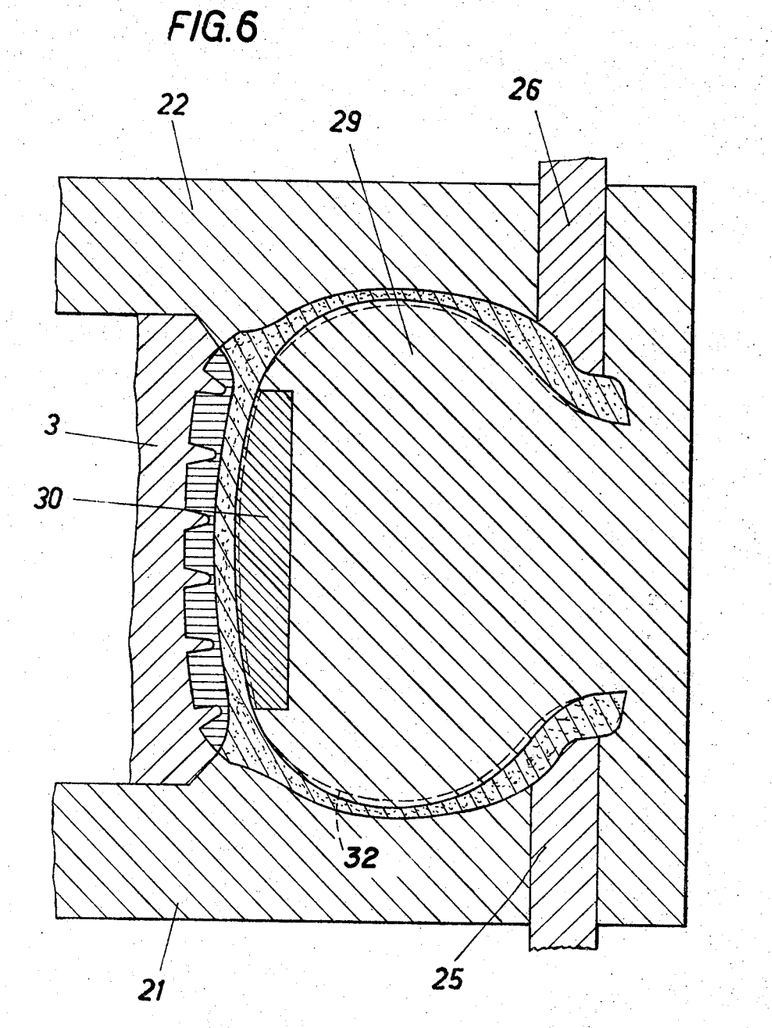
FIG. 6 is a sectional view of a modification of the embodiment depicted in FIGS. 4 and 5.
Figure 7:
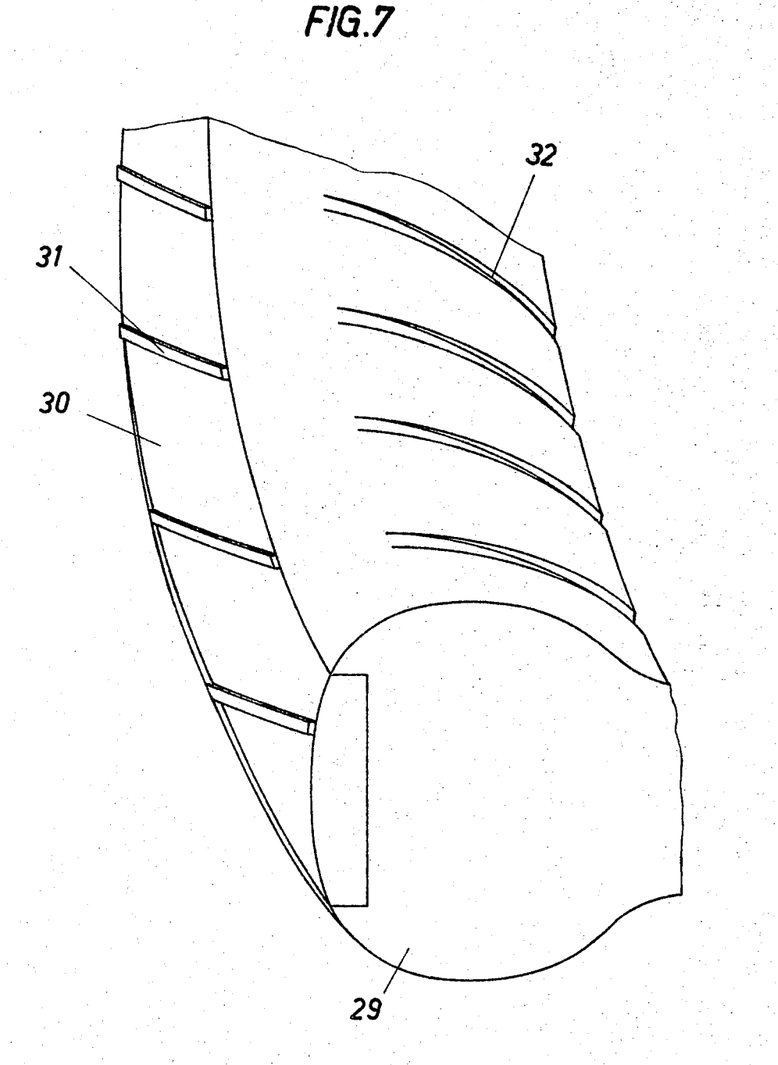
FIG. 7 is a front view of a portion of the apparatus used in the arrangement of FIG. 6.

Now in order to achieve an improved orientation in the peripheral direction at the region of the tread, with the embodiment of apparatus as depicted in FIG. 6, there is advantageously provided at the mold core 29 a substantially ring-shaped section 30 which is located directly beneath the tread region. This ring-shaped section 30 is movable in the peripheral direction with respect to the stationary mold core 29. As particularly well seen by referring to FIG. 7, this movable section 30 is provided with ribs 31 serving to improve the fiber orientation at the tread region. Now in order to maintain the radial flow direction at the region of the side walls grooves 32 are advantageously provided at the mold core 29.

For all of the embodiments disclosed herein the shape and number of ribs or grooves is dependent upon the desired orientation at the individual article sections. For instance, the ribs or grooves can be arranged in a crossover or intersecting fashion at two oppositely situated surfaces of the hollow tire mold. In so doing the fibers or the like are oriented in two superimposed layers in different directions so that there is obtained an approximately crosswise oriented assembly.

In the case of elastomers which can be vulcanized the hollow tire mold can simultaneously serve as the vulcanization mold.

Figure 8:
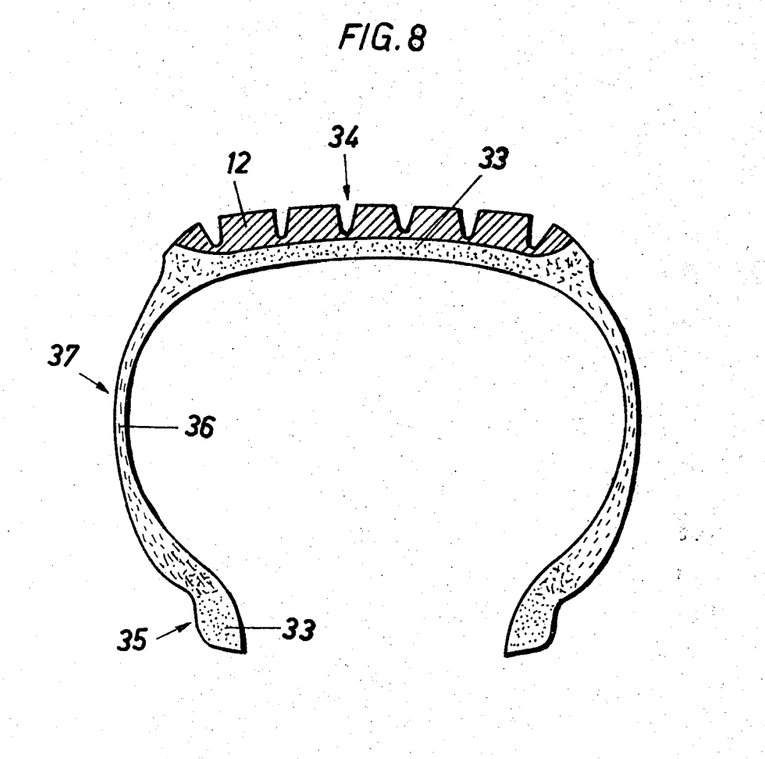
FIG. 8 is a sectional showing of a vehicle tire produced according to the invention.

FIG. 8 illustrates in sectional view an embodiment of inventive tire produced in accordance with the the teachings this development wherein the fibers, filaments 33 or the like at the tread region 34 and at the bead region 35 are oriented in the peripheral direction. The fibers or filaments 36 at the side wall region 37 are oriented essentially perpendicular to the peripheral direction.

In much the same manner it is possible to fabricate also wound-up or heating bellows for the production of tires.

A different orientation of the fibers at different tire sections or portions can also be obtained, as already explained, by winding-up layers with appropriate differently oriented embedded fibers.

Figure 9:
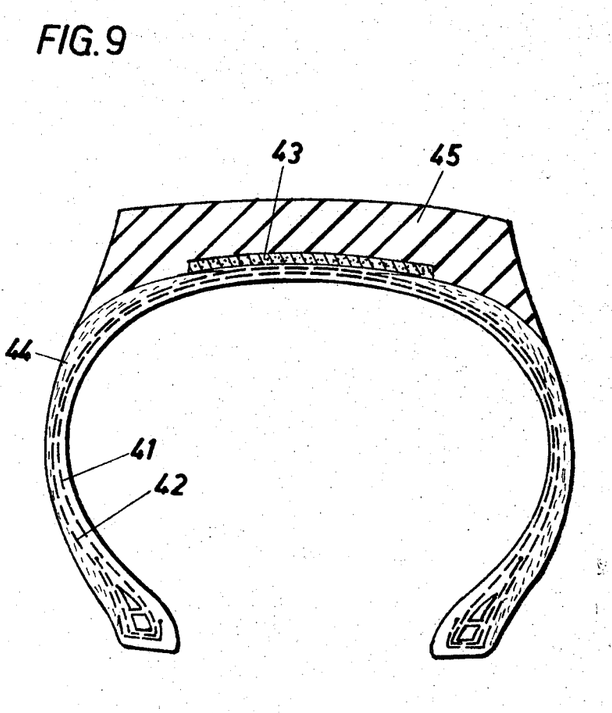
FIGS. 9 to 12 show further vehicle tires or portions thereof in respective sections as produced in accordance with the teachings of this invention.

Now the tire as shown in FIG. 9 consists of two carcass layers 41 and 42, each of which has a thickness of about 1.2 millimeters and in which there are embedded threads or fibers which are oriented in the radial direction. Now a belt layer 43 is applied, at the tread region, to the outer carcass layer 42, this belt layer 43 having embedded therein fibers which are oriented in the peripheral direction. The side wall sections of the tire are reinforced by side strips 44 possessing fibers which are embedded thereing so as to be oriented in the radial direction. The belt layer 43 and partially also the side strips 44 are covered by the tread 45.

Figure 10:
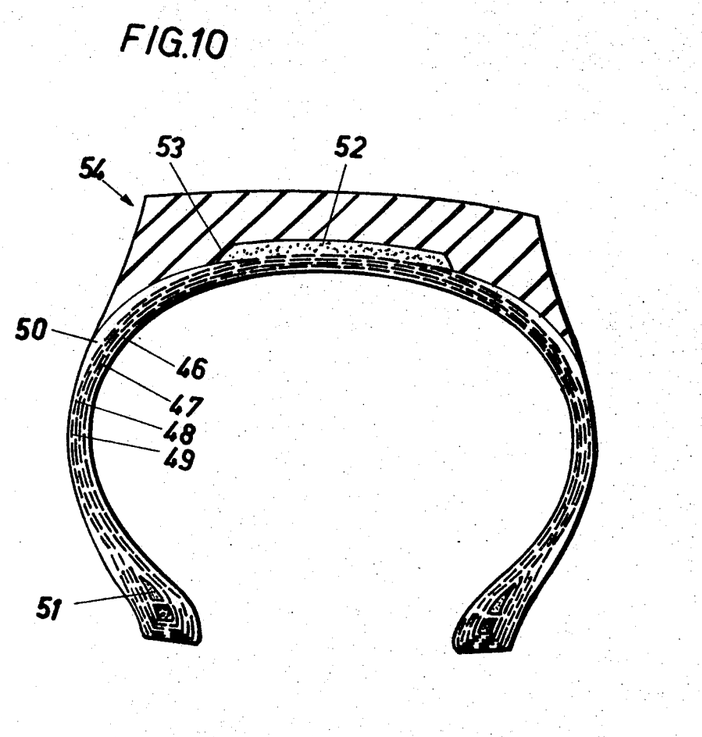

The tire construction shown in FIG. 10 will be seen to embody four carcass layers 46, 47, 48 and 49. By virtue of this arrangement it is possible to construct the individual layers so as to be thinner, namely each such layer possessing a thickness of about 0.6 millimeters, so that during fabrication it is possible to obtain a better orientation of the embedded fibers. The layers themselves are produced in a well known fashion by injection molding or calendering so that the degree of the fiber orientation is dependent upon the processing speed (flow velocity) and upon the cross-section.

In the embodiment under consideration the side wall 50 consists of a rubber mixture which is free of fibers, so that there can be obtained at this region a better surface quality and so as to prevent surface fissure formation by the fibers. The bead wedge 51 consists of a rubber mixture having fibers embedded so as to be oriented in the peripheral direction. Consequently, at this region of the tire there is obtained an optimum rigidity or stiffness. The belt layer 52 will be seen to be equipped with lateral bevelled portions 53 so that at the shoulder region 54 of the tire there is formed a much beter transition zone.

Figure 11:
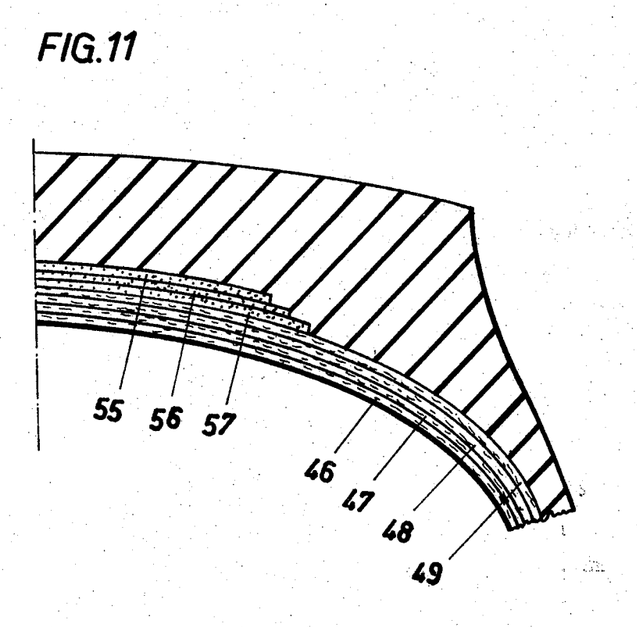

Now with the embodiment of tire as depicted in FIG. 11 the bevelled or chamfered arrangement discussed above is here obtained by providing partial belt layers 55, 56 and 57 which possess a different width with respect to one another and are arranged in superimposed fashion so as to form a substantially step-shaped transition zone. The orientation direction of the fibers in this layer arrangement is, for each of the three layers, different and specifically amounts to 30° for the layer 55, +78° for the layer 56 and −78° for the layer 57, measured with respect to the radial direction, so that there is formed in the usual well known manner a triangular assembly.

Figure 12:
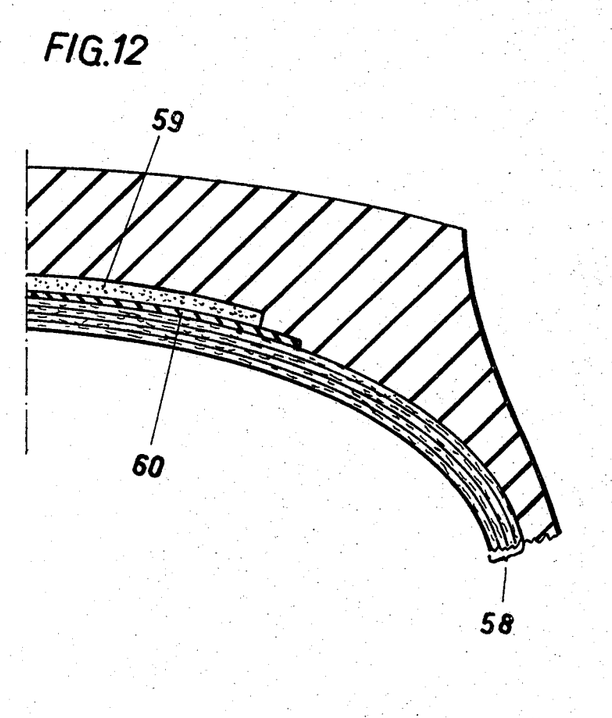

With the embodiment of tire construction shown in FIG. 12 the previously mentioned error source is prevented in that a layer 60 is arranged between the carcass 58 and the belt 59, layer 60 being wider than the belt layer 59 and preventing, at this region, a pressing-in of the belt layer and the tread into the carcass. This layer 60 can be formed of a harder material or a material which is similar to the material of the tread, however pre-vulcanized.

Furthermore, by specially designing the hollow tire mold, for instance by providing different designs for the dimensions and/or the grooves or ribs, it is also possible in accordance with the teachings of this invention, to produce asymmetrical tires.

Figure 13:
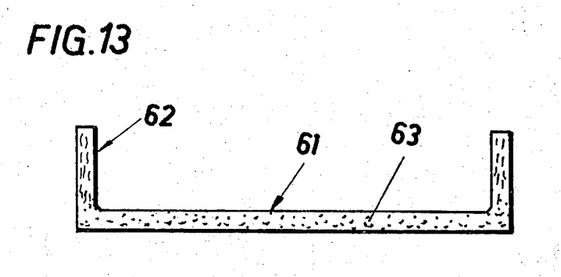
FIG. 13 is a sectional view of a conveyor or transport band produced in accordance with the invention.

Turning now to the article shown in FIG 13 such is a conveyor or transport band, illustrated in sectional view, which has been produced in accordance with the teachings of the present invention and consists of a base or bottom section 61 and two side walls 62. At this base or bottom section 61 the fibers 63 are oriented in the lengthwise direction and at the side walls 62 in the transverse direction. Due to these measures as taught by this invention there is provided a conveyor band capable of taking-up tensional forces at the base section whereas the side walls are sufficiently elastic in order to be able to take-up the different elongations which occur at the region of the deflecting rolls.

Figure 14:
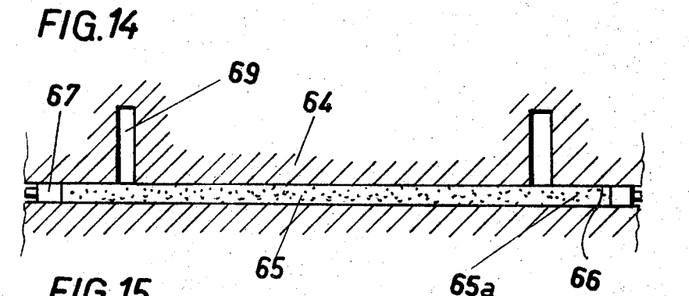
FIGS. 14 and 15 show different respective operating phases during the fabrication of the conveyor or transport band of FIG. 13.

Now in FIGS. 14 and 15 there is illustrated a form of apparatus which can be successfully utilized for fabricating the conveyor band depicted in FIG. 13. More particularly, it will be seen that FIG. 14 illustrates the first phase of operation during which a semi-finished product 65 for forming the conveyor band is inserted into the mold 64. The ends 65a of this semi-finished product 65 are located at the auxiliary compartments 66 of the mold 64 in which there are displaceably arranged pistons or slide-shaped elements or sections 67.

Figure 15:
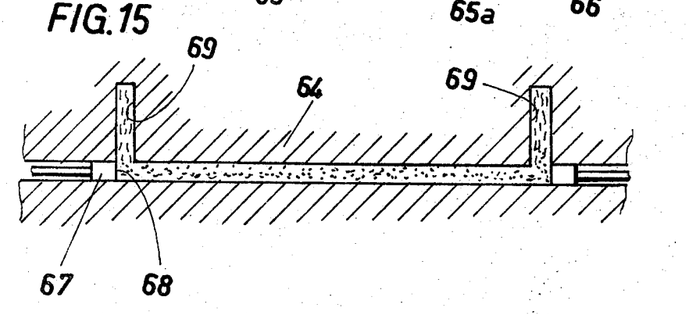

During the second manufacturing step or phase, as best seen by referring to FIG. 15, these movable elements 67 are displaced towards the hollow compartment of the mold so that the working surfaces 68 of these movable elements 67 form at their terminal position portions of the hollow mold. The ends 65a of the semi-finished product 65 are displaced into the remaining hollow portions 69 of the mold 64, resulting in a reorientation of the fibers.

Finally there will now be presented certain exemplary illustrations of specific examples for the purpose of even more fully explaining the teachings of the present invention:

EXAMPLE 1

A natural rubber mixture is mixed in a kneader with 20% by weight polyester fibers having a length of 80 millimeters and possessing a titer of 3.3 den. From this mixture there are drawn plates at the calender and such are vulcanized in a conventional way. A comparison of the obtained properties of such a fiber layer in contrast to a cord reinforced rubber layer or a cord fabric layer with pressed-on-rubber has been set forth in the following table, and specifically in each instance separate values have been given for the lengthwise direction (l) and transverse direction (q) of the fiber orientation.

|  | Cord reinforced | | Fiber reinforced | |
| --- | --- | --- | --- | --- |
|  | l | q | l | q |
| Strength in kg./m.² | 1,000 | 80 | 520 | 74 |
| Rupture of breaking elongation in percent | 134 | 400 | 21 | 200 |
| M 133 in kg./cm.² (modulus) |  | 22 |  | 43 |
| Elongation in percent at 100 kg./cm.² load | 1.5 |  | 4.5 |  |

In the above Table, in the case of a tire, the values of 520 and 21 would be approximately 500 and 20 respectively.

Such plates are, for instance, utilized for the inventive winding-up of raw tire products, for instance of the type disclosed in FIG. 11. It has been found that even the strength in the lengthwise direction, which has been reduced to one-half in comparison to a cord reinforced layer is sufficient owing to the improved uniformity since there is attained a uniform force distribution. Therefore, a tire equipped with such inserts can exhibit the same longevity since there is available a larger surface for the adhesion between the rubber and the fibers. The rupture or breaking elongation of 200% attained with the inventive fiber layers in the transverse direction is considerably more advantageous for the behavior of the tire than the considerably higher rupture elongation which prevails in the case of conventionally manufactured tires, since with the last mentioned tires there oftentimes is present too great an elasticity which is disadvantageous.

EXAMPLE 2

In analogous manner as in Example 1 a rubber mixture formed on the basis of 70% natural rubber and 30% oil extended styene butadiene rubber is mixed with 25% by weight (based upon the entire mixture) glass fibers of 8 millimeters length. These fibers possessing a diameter in the range of 0.01–0.05 millimeters. The shorter the fiber pieces at the polymeric material containing the fibers that much greater must and can be filled the polymeric material with the fibers in order to achieve a desired modulus and that much better must there be designed the adhesion system. The greater the fiber filling of the polymeric material, that much higher will become also the modulus of elasticity. However, the mixture also becomes stiffer and is more difficult to work, and in the completely vulcanized condition generally produces an increased heat development. On the other hand, the modulus also increases with the length of the fiber pieces at the polymeric material.

EXAMPLE 3

In the same manner as described in conjunction with Examples 1 and 2 above there is mixed into a rubber mixture formed on the basis of 50% natural rubber, 20% polybutadiene and 30% styrene butadiene, a respective 15% by weight (based upon the entire mixture) of 40 millimeter long polyamide fibers of a thickness 0.01–0.03 millimeters and 60 millimeter long polyester fibers having a titer of 3.3 den. With such a mixture it can be especially advantageous to maintain as large as possible the ratio of the modulus in the lengthwise direction and transverse direction, whereby when using such fiber reinforced plates in two different directions (namely approximately radially for the carcass and approximately in the direction of travel of the tire with respect to the belt) it is possible to produce exceptional properties for radial tires.

The average length of the fibers used in practising the invention as disclosed herein is generally approximately in a range of 8 to 80 millimeters. In the case of high viscosity rubber mixtures it is approximately in the range of 15 to 40 millimeters and in the case of liquid rubber preferably should amount to approximately 40 to 75 millimeters. Finally, it is mentioned that either before and/or during and/or after the flow operation the section or portion of the molded article not subjected to such flow operation can be pre-vulcanized.

The term "fibers" as used herein is employed in its broader sense and generally is intended to encompass not only fibers as such, but also yarns, threads, filaments, and the like.

While there is shown and described present preferred embodiments of the invention, it is to be distinctly understood that the invention is not limited thereto but may be otherwise variously embodied and practiced within the scope of the following claims.

Accordingly,

What is claimed is:

1. A molded article comprising a layer formed of an elastomeric material and essentially oriented fibers embedded in said elastomeric material, said layer including at least two sections containing fibers, the fibers of one of said sections having a substantially different orientation than the fibers of the other section when said sections are viewed projected into substantially a common plane, each of said sections possessing respectively different fiber orientation directions of said two sections, said layer comprising at least 10% fibers by weight, said fibers having an average length not exceeding 80 mm.

2. The molded article as defined in claim 1, wherein said elastomeric material is liquid rubber.

3. The molded article as defined in claim 2, wherein said liquid rubber is polybutadiene containing hydroxyl groups cross-linked with isocyanate.

4. The molded article as defined in claim 2, wherein said liquid rubber is polybutadiene containing carboxyl groups cross-linked with epoxy resin.

5. The molded article as defined in claim 1, wherein said elastomeric material comprises a rubber mixture formed on the basis of natural rubber having embedded therein said fibers in an amount greater than 10% by weight of said rubber mixture.

6. The molded article as defined in claim 5, wherein the embedded fibers amount to 20% to 40% by weight of the weight of the rubber mixture.

7. The molded article as defined in claim 1, wherein said elastomeric material comprises a mixture formed on the basis of approximately 50 parts by weight natural rubber, approximately 20 parts by weight polybutadiene rubber and approximately 30 parts by weight oil extended styene polybutadiene rubber, and an additive in the form of at least one nitroso compound for improving the workability of said elastomeric material.

8. The molded article as defined in claim 1, wherein said sections of respective different direction of orientation of the fibers possess different respective degrees of hardness.

9. The molded articles as defined in claim 1, wherein the modulus of elasticity in the fiber orientation direction and in a direction transverse thereto is in a ratio in the range of 30:1 and 200:1.

10. The molded article as defined in claim 9, wherein said ratio is preferably in a range between 50:1 and 100:1.

11. The molded article as defined in claim 1, wherein said fibers embedded in said elastomeric material are both polyamide fibers present in the range of approximately 10% to 20% by weight and polyester fibers present in the range of approximately 10% to 20% by weight.

12. The molded article as defined in claim 1, wherein said fibers possess an average length of approximately 8 to 80 millimeters.

13. The molded article as defined in claim 12, wherein the average length of said fibers is preferably in the range of 40 to 75 millimeters.

14. The molded article as defined in claim 1, wherein said molded article comprises a conveyor band having a bottom section containing fibers oriented in the lengthwise direction, said conveyor band also having side walls containing fibers oriented in the transverse direction.

15. The molded article as defined in claim 1, wherein said fibers possess an average length in the range of approximately 40 to 75 millimeters and the elastomeric material is liquid rubber.

16. The molded article as defined in claim 1, wherein said fibers possess an average length in the range of approximately 15 to 40 millimeters and the elastomeric material is a highly viscous rubber mixture.

References Cited

UNITED STATES PATENTS

| | | | |
|---|---|---|---|
| 2,937,684 | 5/1960 | Rockoff | 152—362 |
| 3,118,482 | 1/1964 | Beissner | 152—354 |
| 3,244,214 | 4/1966 | Bush | 152—354 |
| 3,578,544 | 5/1971 | Thorsrud | 161—59 |
| 3,449,482 | 6/1969 | Mitchell et al. | 161—59 |
| 3,486,547 | 12/1969 | Powers | 152—354 |

GEORGE F. LESMES, Primary Examiner

J. J. BELL, Assistant Examiner

U.S. Cl. X.R.

152—354, 356; 156—125, 128, 245; 161—166, 176; 264—108, 326; 425—28